(12) United States Patent
Tiedemann et al.

(10) Patent No.: US 9,031,500 B2
(45) Date of Patent: May 12, 2015

(54) PORTABLE ELECTRONIC DEVICE AND OPERATION METHOD FOR ESTABLISHING A NEAR FIELD COMMUNICATION LINK

(75) Inventors: Stephen Tiedemann, Stuttgart (DE); Frank Dawidowsky, Stuttgart (DE); Klaus Röhrle, Ostfildern (DE); Meik Buscemi, Stuttgart (DE)

(73) Assignee: SONY Corporation, Tokyo (JP)

( * ) Notice: Subject to any disclaimer, the term of this patent is extended or adjusted under 35 U.S.C. 154(b) by 209 days.

(21) Appl. No.: 13/349,104

(22) Filed: Jan. 12, 2012

(65) Prior Publication Data
US 2012/0202423 A1    Aug. 9, 2012

(30) Foreign Application Priority Data

Feb. 3, 2011    (EP) ..................................... 11000874

(51) Int. Cl.
*H04B 5/00*    (2006.01)
*H04W 52/02*   (2009.01)

(52) U.S. Cl.
CPC ...... *H04W 52/0254* (2013.01); *H04M 2250/04* (2013.01); *H04M 2250/12* (2013.01); *Y02B 60/50* (2013.01)

(58) Field of Classification Search
CPC ....................... G06K 19/0716; G06K 19/0723
USPC ............................................... 455/41.1, 41.2
See application file for complete search history.

(56) References Cited

U.S. PATENT DOCUMENTS

| 7,446,658 | B2 * | 11/2008 | Panotopoulos ............ 340/539.3 |
| 8,457,651 | B2 * | 6/2013  | Forutanpour et al. ...... 455/456.1 |
| 2006/0256074 | A1 | 11/2006 | Krum et al. |
| 2008/0109309 | A1 | 5/2008  | Landau et al. |
| 2009/0017799 | A1 | 1/2009  | Thorn |
| 2010/0013762 | A1 | 1/2010  | Zontrop et al. |
| 2011/0081923 | A1 | 4/2011  | Forutanpour et al. |
| 2011/0083111 | A1 | 4/2011  | Forutanpour et al. |

FOREIGN PATENT DOCUMENTS

| EP | 0 952 500 A1 | 10/1999 |
| EP | 2 146 490 A1 | 1/2010 |
| WO | WO 2011/041434 A1 | 4/2011 |

OTHER PUBLICATIONS

Extended European Search Report issued Oct. 16, 2012 in Patent Application No. 11009297.0.

* cited by examiner

*Primary Examiner* — Eugene Yun
(74) *Attorney, Agent, or Firm* — Oblon, McClelland, Maier & Neustadt, L.L.P.

(57) ABSTRACT

A portable electronic device (110) with a NFC (near field communication) unit (114) is switchable between an active mode and a passive mode. A motion sensor unit (112) records a motion of the portable electronic device (110), and outputs a motion signal descriptive for the recorded motion. A processing unit (111) analysis the motion signal to detect a first predefined motion pattern including an acceleration and a deceleration phase. The NFC unit (114) is switched into the active mode upon detection of a first predefined motion pattern descriptive for an NFC touch gesture.

20 Claims, 4 Drawing Sheets

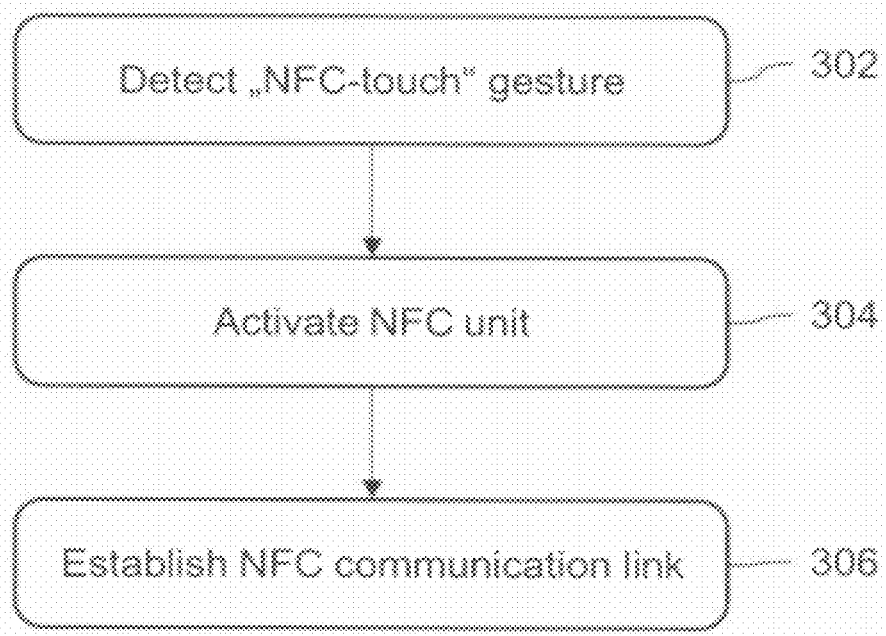

PORTABLE ELECTRONIC DEVICE AND OPERATION METHOD FOR ESTABLISHING A NEAR FIELD COMMUNICATION LINK

The present invention relates to handheld electronic devices adapted to establish a near field communication link. An embodiment relates to a portable electronic device including a near field communication unit switchable between an active mode in which the near field communication unit generates a radio frequency field and an idle mode in which the near field communication unit does not generate a radio frequency field. Another embodiment refers to a method of operating a portable electronic device including a near field communication unit.

Portable electronic devices providing near field communication (NFC) technology allow a user to perform a plurality of different actions, such as exchanging contact details, data files or payment information by a simple touch of the portable device to another portable or to a stationary device. To start NFC communication, typically one of the two electronic devices emits an RF (radio frequency) field and polls for the presence of a listening device. The listening device may be a device with activated receiver or a device with a passive transponder technology transmitting data by modulating the RF field transmitted by the polling device. In each case, power consumption for polling is considerably higher than for listening. Conventionally, power consumption in portable devices featuring NFC technology is reduced by generating the RF field or initiating a polling sequence only when the user deliberately activates the NFC feature by pressing a specific button or by selecting an appropriate menu item on a display of the portable device. According to another approach activation of the NFC feature is coupled to another information indicating that the portable device is not in an idle or standby mode. For example, activation of the NFC feature may be linked with an illumination state of a display or a keypad indicating that the portable electronic device is currently not in an idle or standby mode.

The object of the invention is providing a portable electronic device with a near field communication unit achieving a high power saving rate at high ease of operation. The object is achieved with the subject-matter of the independent claims. Further embodiments are defined in the dependent claims, respectively. Details and advantages of the invention will become more apparent from the following description of embodiments in connection with the accompanying drawings. Features of the various embodiments may be combined unless they exclude each other.

FIG. 3 is a simplified flowchart referring to a method of operating a portable electronic device including a near field communication unit in accordance with yet a further embodiment of the invention.

Figure 1:
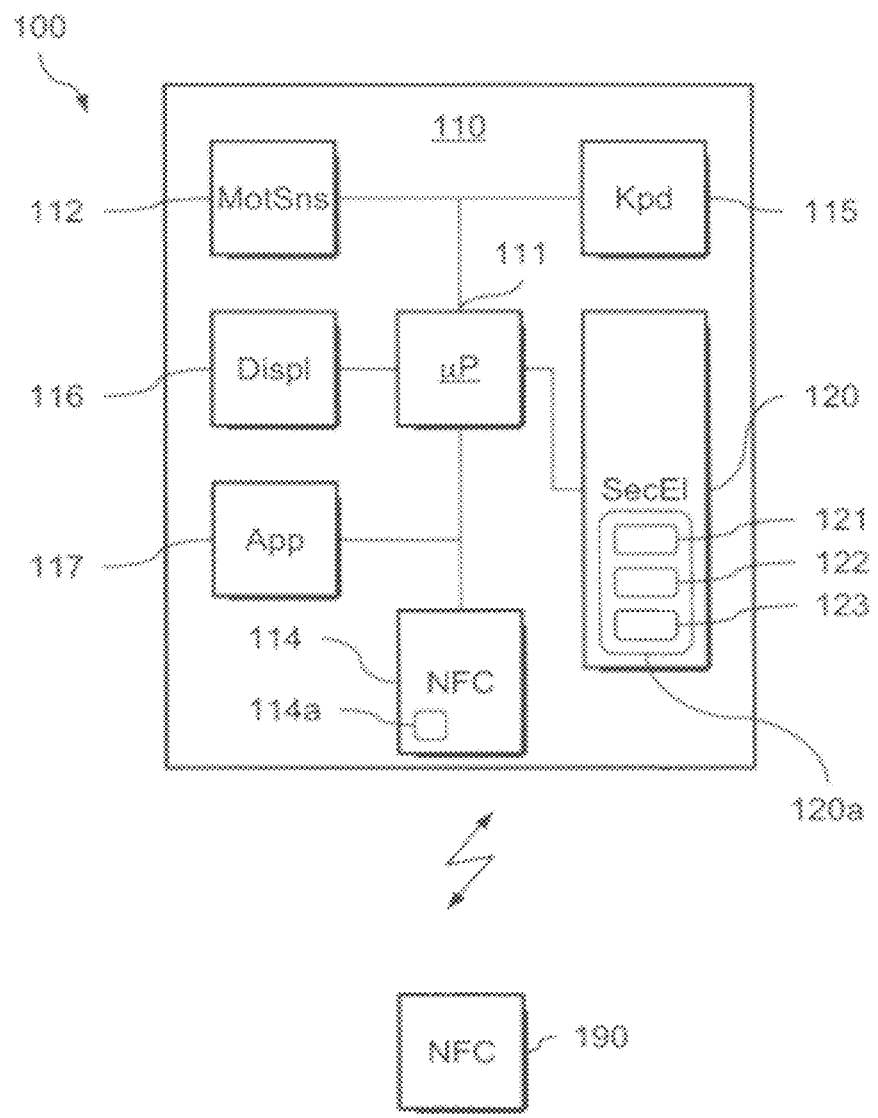
FIG. 1 is schematic block diagram of a near field communication system including a portable electronic device in accordance with an embodiment of the invention.

FIG. 1 shows a near field communication system 100 with a portable electronic device 110 establishing a near field communication link with another portable or stationary electronic device 190. The portable electronic device 110 may be a portable communication apparatus like a mobile phone, a cellular phone, a personal digital assistant (PDA), a smart phone or a pager. According to other embodiments, the portable electronic device may be provided without further far-range wireless communication interfaces, for example a music player, an electronic book, a camera, or a powered device for an application specific purpose, for example an identification device.

The portable electronic device 110 may include a keypad 115 allowing a user to input data and commands and a display 116 for outputting data to the user. The portable electronic device 110 may further include a plurality of application units 117 providing, for example, camera, far-range RF communications, speaker, microphone, and further local wireless communications functionalities. A processing unit 111 of the portable electronic device 110 is connected to the keypad 115, the display unit 116 and the application units 117 and provides control of the subunits of the portable electronic device 110.

The portable electronic device 110 includes a near field communication (NFC) unit 114 that is switchable between a first mode (active mode) in which the NFC unit 114 transmits a polling signal and a second mode (listening mode, idle mode) in which the NFC unit 114 does not transmit a polling signal. According to an embodiment, the NFC unit 114 generates and emits a radio frequency field in the active mode and does not generate or emit a radio frequency field in the passive mode. A motion sensor unit 112 integrated in the portable electronic device 110 records a motion of the portable electronic device 110 and outputs a motion signal descriptive for the recorded motion.

According to the illustrated embodiment, the motion sensor unit 112 is a subunit connected to the processor unit 111. In accordance with other embodiments (not illustrated) the motion sensor unit 112 may be integrated in one of the other subunits, for example in the NFC unit 114. For example, the NFC functionality and the motion sensor unit 112 may be integrated in the same chip package or the same IC.

The motion sensor unit 112 may include a plurality of sensor subunits, wherein each sensor subunit records another type of motion. For example, the motion sensor unit 112 records linear motion with regard to at least one direction, for example three orthogonal directions, and/or rotational motion with regard to at least one axis, for example three orthogonal axes. Each sensor subunit may include an accelerometer unit adapted to measure a physical acceleration experienced by the portable electronic device 110. Each accelerometer may be realized as an MEMS (microelectromechanical system).

The processing unit 111 may receive and analyze the motion signal output by the motion sensor unit 112 and may compare a captured motion pattern described by the motion signal with a first predefined motion pattern. When a deviation of the captured motion pattern from the first predefined motion pattern is within a predefined range, the processing unit 111 decides the captured motion pattern to represent the first predefined motion pattern and transmits an appropriate control signal to switch the NFC unit 114 from the second mode to the first mode. A temporal-directional signature of the first predefined motion pattern includes a first phase indicating an acceleration of the portable device 110 and a second phase indicating a deceleration of the portable device 110. According to an embodiment the first phase indicates a moderate acceleration and the second phase a significant deceleration, wherein the acceleration rate is lower than the deceleration rate.

A typical application for near field communication concerns data exchange between the portable electronic device 110 and another portable or stationary device, for example for exchanging contact data, address data, text files, picture data or audio contents. Other applications refer to cash cards, access control systems, electronic ticket systems, online card-payment systems, e-money systems and identification systems, where the user brings the medium containing the identification or payment information, for example the portable electronic device 110, in close vicinity to the other electronic device 190, which may be a reader device, a reader/writer device or an electronic cashpoint, by way of example. When the user wants to identify himself or wants to execute a payment function, he moves the portable electronic device 110 with a typical gesture ("NFC touch gesture") away from his body in the direction of the other electronic device 190. The acceleration is more moderate than the deceleration at the vicinity of the reader device. Hence the NFC touch gesture can be differentiated from many other movements like walking at a reasonable high probability. Erroneous detections of NFC touch gestures only affect the maximum achievable power savings but not the user experience.

The other electronic device 190 may include an active transponder which is in a listening state by default and which wakes up and actively transmits only after receiving a polling signal. In accordance with another embodiment, the NFC unit 114 may be configured to communicate with electronic devices including a passive transponder, like RF ID (radio frequency identification) tags. According to an embodiment, the NFC unit 114 is configured to communicate in accordance with the ISO/IEC 18029 standard, any standard based on the ISO/IEC 18029 standard or any NFC Forum Digital Protocol Specification. In addition or alternatively, the NFC unit 114 may communicate according to the ISO/IEC 14443 standard. Future standards are likewise feasible.

Each gesture involving a motion of the portable electronic device 110 gives a certain temporal-directional signature in the motion signal that is output by the motion sensor unit 112. With regard to the NFC touch gesture the signature contains information on a directional motion with a moderate acceleration phase and a phase of sharp deceleration when the user stops the hand holding the portable electronic device 110 in the vicinity of the other electronic device 190 with which the communication link is established. The signature may also contain information on the distance between the start point and the end point of the motion, which may be about a half arm length.

The first predefined motion pattern and/or the margins within which the computed motion is considered to correspond to the first predefined motion pattern may be defined such that a great variety of gestures actuated by different persons are identified as being in agreement with the first predefined motion pattern. In accordance with other embodiments, the first predefined motion pattern may be defined more precisely in order to reduce the number of erroneous detections of the NFC touch gesture. According to an embodiment, the first predefined motion pattern may be defined during a learning phase for each user individually.

Figure 2A:
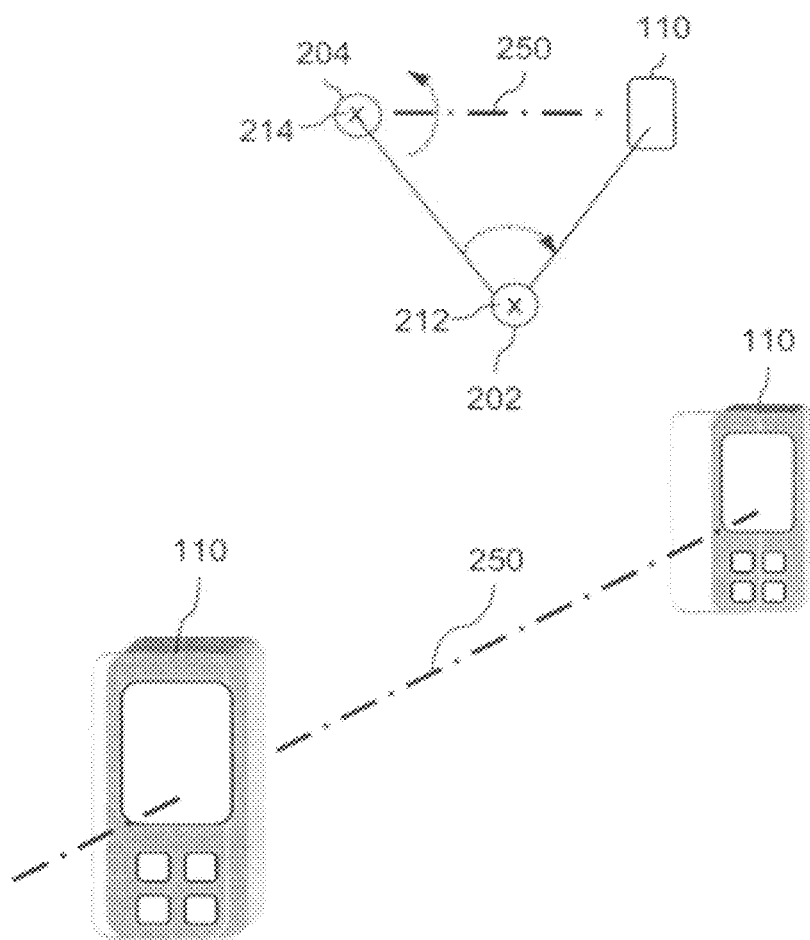
FIG. 2A is a schematic diagram illustrating a movement of a portable electronic device along a straight line for illustrating effects of the invention related to an embodiment of the invention.

FIG. 2A refers to an embodiment, where the NFC touch gesture is prescribed as a motion along an approximately straight line 250 wherein the user stretches the arm in the elbow joint 202 around axis 212 and lifts the upper arm in the shoulder joint 204 around axis 214 in a way to compensate for the rotation of the fore arm in the elbow joint 202. Accordingly, the first predefined motion pattern may be predefined as a motion of a hand holding the portable electronic device along the approximately straight line 250 including a first phase of moderate acceleration and a second phase of sharp deceleration, where the second phase is shorter than the first phase, in order to ensure a motion signature that can be distinguished from other motions with high probability. According to further embodiments, the first predefined motion pattern may include stop phases without any motion before the acceleration phase and subsequent to the deceleration phase.

Figure 2B:
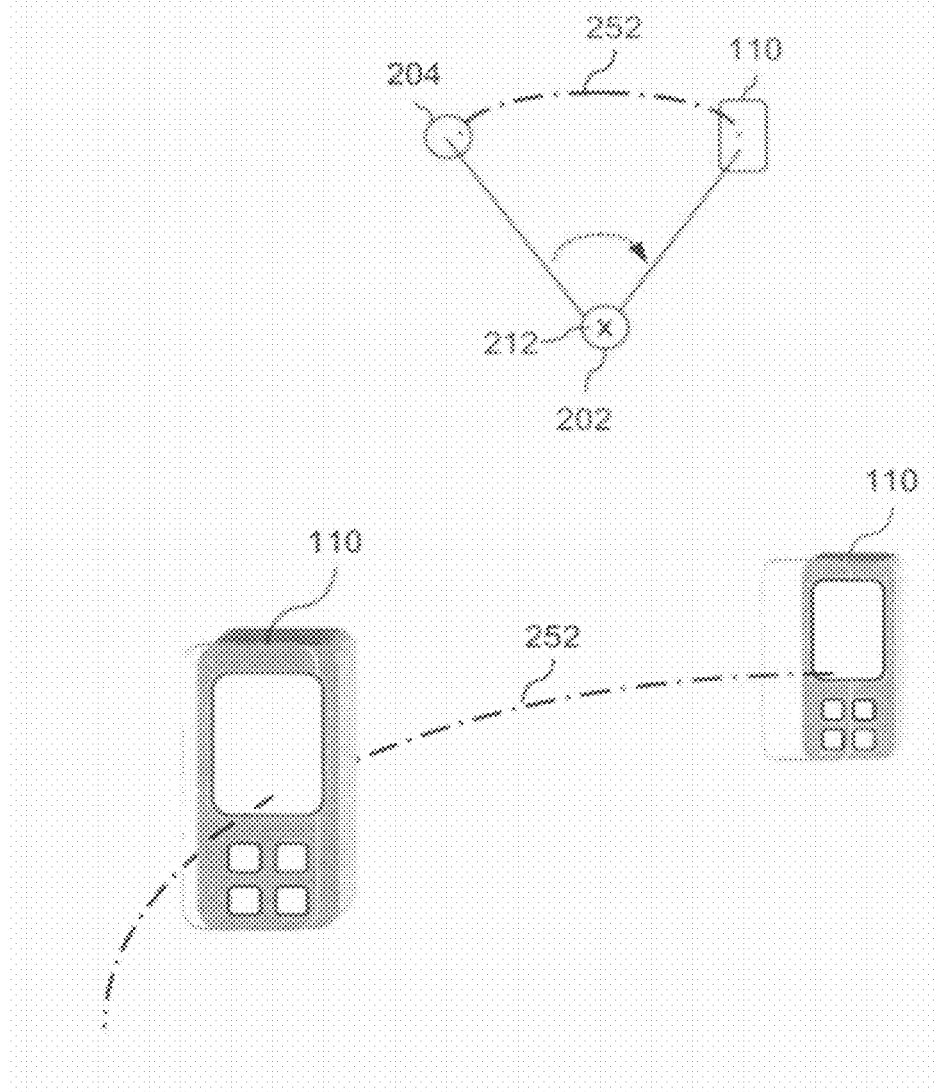
FIG. 2B is a schematic diagram for illustrating a bended trajectory of a portable electronic device at fixed shoulder joint for illustrating effects of the invention related to another embodiment.

FIG. 2B refers to an embodiment where the first predefined motion pattern corresponds to a NFC touch gesture including the stretching of the arm with the hand holding the portable electronic device 110 by stretching the elbow joint 202 around axis 212 at fixed or almost fixed shoulder joint 204. In this case, a trajectory 252 of the portable electronic device 110 is bowed with a first phase of moderate acceleration and a second phase of abrupt deceleration along sections of the curved trajectory 252, respectively. Since this type of gesture is easy to learn and can be distinguished with high probability from many other motions a portable electronic device may be subjected to, the power saving rate can be improved.

According to another embodiment, the processing unit 111 is further configured to detect a second predefined motion pattern before detection of the first predefined motion pattern and to control operation of the NFC unit 114 in response to detection of the second predefined motion pattern before or after the NFC unit 114 is switched into the active mode.

For example, the second predefined motion pattern may be descriptive for a selection gesture for selecting predefined data or a predefined application. The selection gesture may be a well-defined gesture like shaking, pouring, pitching, rolling or jawing, for example rotating the fore arm around the fore arm longitudinal axis in the elbow joint with the portable electronic device in the hand. The assignment between gesture and application or application data may be predefined or programmable by the user.

According to an embodiment the portable electronic device may perform at least two different applications, for example a first and a second payment functionality concerning different accounts. When the user approaches to an electronic cashpoint device, he may first perform a selection gesture in order to select the account that he intends to debit in the present case. Then the user may perform the NF touch gesture. After the communication link has been established, the electronic cashpoint device receives the information required for debiting the selected account without further user interaction. Another selection gesture may be predefined for the other account.

The following embodiment refers to an approach where the NFC unit 114 is configured to execute at least two different applications and where the processing unit 111 is configured to select the application executed by the NFC unit 114 in response to detection of the second predefined motion before the NFC unit 114 is switched into the first mode.

Referring back again to FIG. 1, the portable electronic device 110 may comprise a secure element 120 including a first storage element 120a for storing a plurality of communication parameter sets 121, 122, 123 used for establishing a communication link with corresponding applications such as e.g. a plurality of payment services. For example, the secure element 120 may be a SIM (subscriber identity module) card. The NFC unit 114 may also include a second storage element 114a which size may be significantly smaller than a memory available for the processing unit 111. The second storage element 114a in the NFC unit 114 may store a parameter set which is assigned to one of the applications and which is used in an initialization phase when establishing an NFC communication link. When starting to establish a new communication link with another NFC device, the NFC unit 114 may perform an anticollision sequence using the parameter set stored in the second storage element 114a. Where the anticollision parameter set does not match with that of the further electronic device with which the communication link shall be established, the correct anticollision parameter set must be downloaded from the secure element 120 into the NFC unit 114 resulting in a delay when establishing a new communication link.

A specific selection gesture preceding the NFC touch gesture may be used to preselect the correct parameter set for the collision sequence and may be downloaded to the NFC unit 114 in advance before the portable electronic device 110 is in the range of the other electronic device 190.

Once activated the NFC unit 114 may remain in the first mode until the communication between the portable electronic device 110 and the further electronic device 119 is terminated by protocol or by a predefined user input. According to another embodiment, the processing unit 111 is configured to deactivate the NFC unit 114 if after activation no communication link is established at expiry of a predefined activation period of, for example, some seconds to ensure power saving even after erroneous detection of an NFC touch gesture.

FIG. 3 illustrates a method of operating a portable electronic device including an NFC unit. A motion sensor unit integrated in the portable electronic device records a motion of the portable electronic device and outputs a motion signal that is descriptive for the recorded motion (302). A processing unit analysis the motion signal to detect, in the motion signal, a first predefined motion pattern including a first phase of acceleration and a second phase of deceleration (304). The processing unit transmits a control signal to the NFC unit to switch the NFC unit from a second mode into a first mode upon detection of the first predefined motion pattern (306). The first mode is a polling mode where the NFC unit generates a radio frequency field. The second mode may be an idle mode where the NFC unit does not generate a radio frequency field. According to an embodiment the first phase may be one of a moderate acceleration and the second phase may be one of sharp deceleration.

The method may further comprise controlling operation of the near field communication unit in response to detection of a second predefined motion pattern. According to an embodiment, the NFC unit may be operated to transmit data identified by the second predefined motion pattern or to operate according to an application identified by the second predefined motion pattern. For example, parameters and data used by the NFC unit for establishing a communication link may be preselected by the second predefined motion pattern.

The invention claimed is:

1. An electronic device comprising:
near field communication circuitry configured to receive a control signal, the near field communication circuitry being switchable, in response to the control signal, between a first mode in which the near field communication circuitry generates a radio frequency field to communicate with another electronic device and a second mode in which the near field communication circuitry does not generate the radio frequency field to communicate with the another electronic device;
motion sensor circuitry configured to record motion of the electronic device and to output a motion signal descriptive of the recorded motion; and
processing circuitry configured to
receive and analyze the motion signal to detect, in the motion signal, a first predefined motion pattern including a first phase of acceleration and a second phase of deceleration, and
transmit the control signal, to the near field communication circuitry, to switch the near field communication circuitry from the second mode in which the near field communication circuitry does not generate the radio frequency field to communicate with the another electronic device to the first mode in which the near field communication circuitry generates the radio frequency field to communicate with the another electronic device upon detection of the first predefined motion pattern in the motion signal, wherein
the processing circuitry is configured to not transmit the control signal to switch the near field communication circuitry from the second mode to the first mode when another motion pattern, different from the first predefined motion pattern, is detected in the motion signal.

2. The electronic device of claim 1, wherein
the near field communication circuitry is configured to communicate with a passive transponder.

3. The electronic device of claim 2, wherein
the passive transponder includes at least one RFID (radio frequency identification) tag.

4. The electronic device of claim 1, wherein
the near field communication circuitry is configured to communicate in accordance with an ISO/IEC 18029 standard, any standard based on the ISO/IEC 18029 standard or any NFC (near field communication) Forum Digital Protocol Specification.

5. The electronic device of claim 1, wherein
the second phase of deceleration of the first predefined motion pattern is shorter than the first phase of acceleration.

6. The electronic device of claim 1, wherein
the first phase of acceleration and the second phase of deceleration are linear movements along a contiguous straight line or along a bowed trajectory of a human hand when stretching an elbow joint at an unmoved shoulder joint.

7. The electronic device of claim 1, wherein
the processing circuitry is configured to detect a second predefined motion pattern and to control operation of the near field communication circuitry in response to the detection of the second predefined motion pattern.

8. The electronic device of claim 7, wherein
the processing circuitry is configured to operate the near field communication circuitry to transmit data identified by the second predefined motion pattern.

9. The electronic device of claim 7, wherein
the near field communication circuitry is configured to execute at least two different applications, and the processing circuitry is configured to select one of the at least two different applications executed by the near field communication circuitry in response to detection of the second predefined motion pattern and to provide application specific parameters to the near field communication circuitry before switching the near field communication circuitry to the first mode.

10. The electronic device of claim 1, wherein
the processing circuitry is configured to deactivate the near field communication circuitry, if after activation no communication link has been established at expiry of a predefined activation period.

11. A near field communication system comprising:
the electronic device of claim 1; and
a further electronic device operable to establish a communication link with the electronic device using the near field communication circuitry.

12. The electronic device of claim 1, wherein
the detection, performed by the processing circuitry, of the first predefined motion pattern in the motion signal includes determining whether a deviation of the motion signal is within a predefined range from the first predefined motion pattern.

13. The electronic device of claim 12, wherein
the processing circuitry is configured to transmit the control signal to switch the near field communication circuitry to the first mode when the deviation of the motion signal is determined to be within the predefined range from the first predefined motion pattern.

14. The electronic device of claim 1, wherein
the near field communication circuitry is configured to communicate with an active transponder.

15. The electronic device of claim 1, wherein
the recorded motion includes a linear motion of the electronic device with respect to at least one direction, and a rotational motion of the electronic device with respect to at least one axis.

16. A method of operating an electronic device, the method comprising:
recording motion of the electronic device using motion sensor circuitry integrated in the electronic device and outputting a motion signal descriptive of the recorded motion;
analyzing the motion signal using processing circuitry to detect, in the motion signal, a first predefined motion pattern including a first phase of acceleration and a second phase of deceleration; and
transmitting a control signal using the processing circuitry, to near field communication circuitry, to switch the near field communication circuitry from a second mode in which the near field communication circuitry does not generate a radio frequency field to communicate with another electronic device to a first mode in which the near field communication circuitry generates the radio frequency field to communicate with the another electronic device in response to detection of the first predefined motion pattern in the motion signal, wherein
the processing circuitry is configured to not transmit the control signal to switch the near field communication circuitry from the second mode to the first mode when another motion pattern, different from the first predefined motion pattern, is detected in the motion signal.

17. The method of claim 16, further comprising:
controlling operation of the near field communication circuitry in response to detection of a second predefined motion pattern, wherein
the near field communication circuitry is operated to transmit data identified by the second predefined motion pattern.

18. The method of claim 16, further comprising:
controlling operation of the near field communication circuitry in response to detection of a second predefined motion pattern, wherein
an application executed by the near field communication circuitry is selected in response to detection of the second predefined motion pattern, and
application specific parameters are provided to the near field communication circuitry before switching the near field communication circuitry into the first mode.

19. The method of claim 16, further comprising:
deactivating the near field communication circuitry, if after activation no communication link has been established at expiry of a predefined activation period.

20. A non-transitory computer-readable storage medium storing computer-readable program instructions that, when executed by a computer, cause the computer to execute a method comprising:
recording motion of an electronic device using motion sensor circuitry integrated in the electronic device, and outputting a motion signal descriptive of the recorded motion;
analyzing the motion signal using processing circuitry to detect, in the motion signal, a first predefined motion pattern including a first phase of acceleration and a second phase of deceleration; and
transmitting a control signal using the processing circuitry, to near field communication circuitry, to switch the near field communication circuitry from a second mode in which the near field communication circuitry does not generate a radio frequency field to communicate with another electronic device to a first mode in which the near field communication circuitry generates the radio frequency field to communicate with the another electronic device in response to detection of the first predefined motion pattern in the motion signal, wherein
the processing circuitry is configured to not transmit the control signal to switch the near field communication circuitry from the second mode to the first mode when another motion pattern, different from the first predefined motion pattern, is detected in the motion signal.

* * * * *